UNITED STATES PATENT OFFICE.

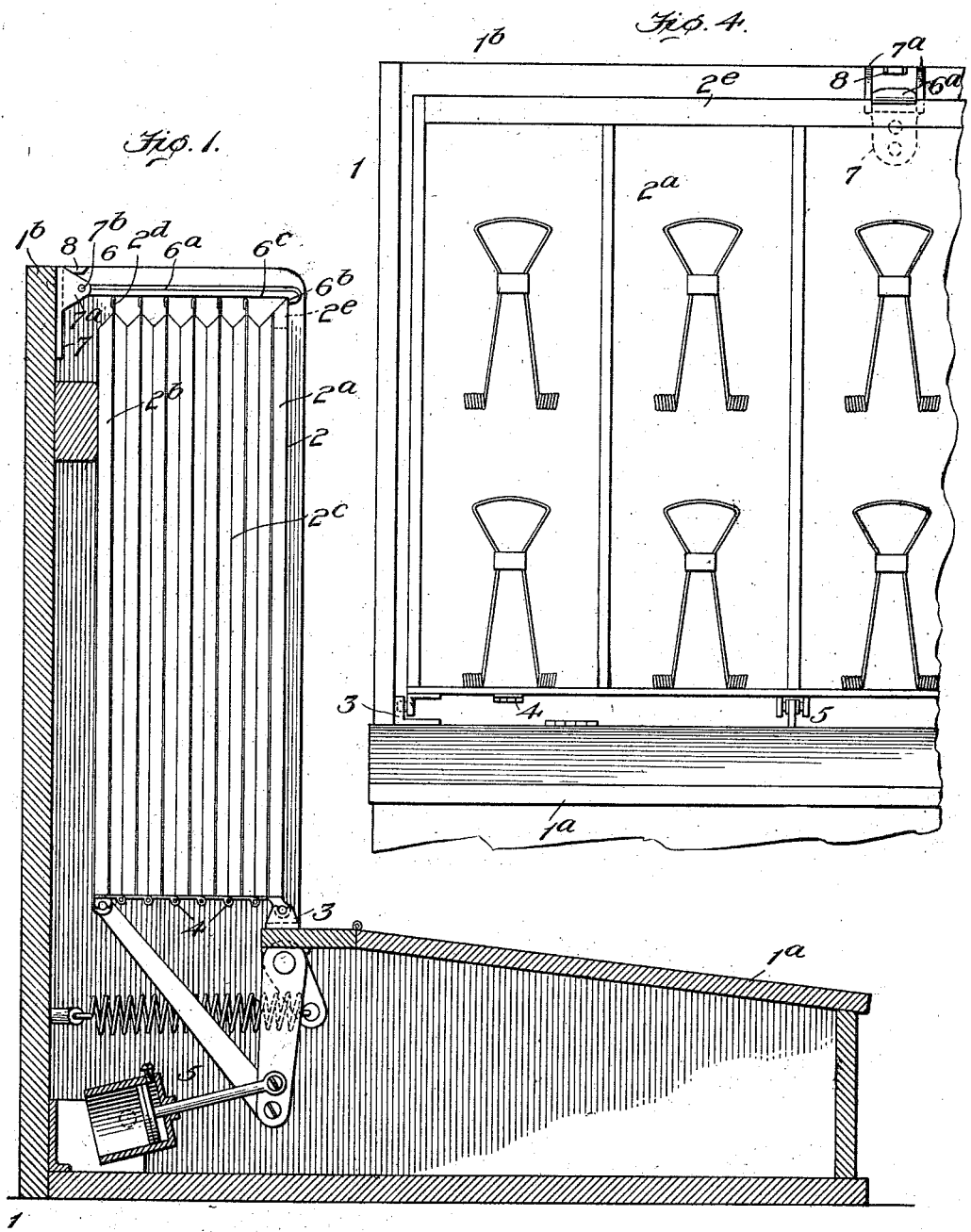

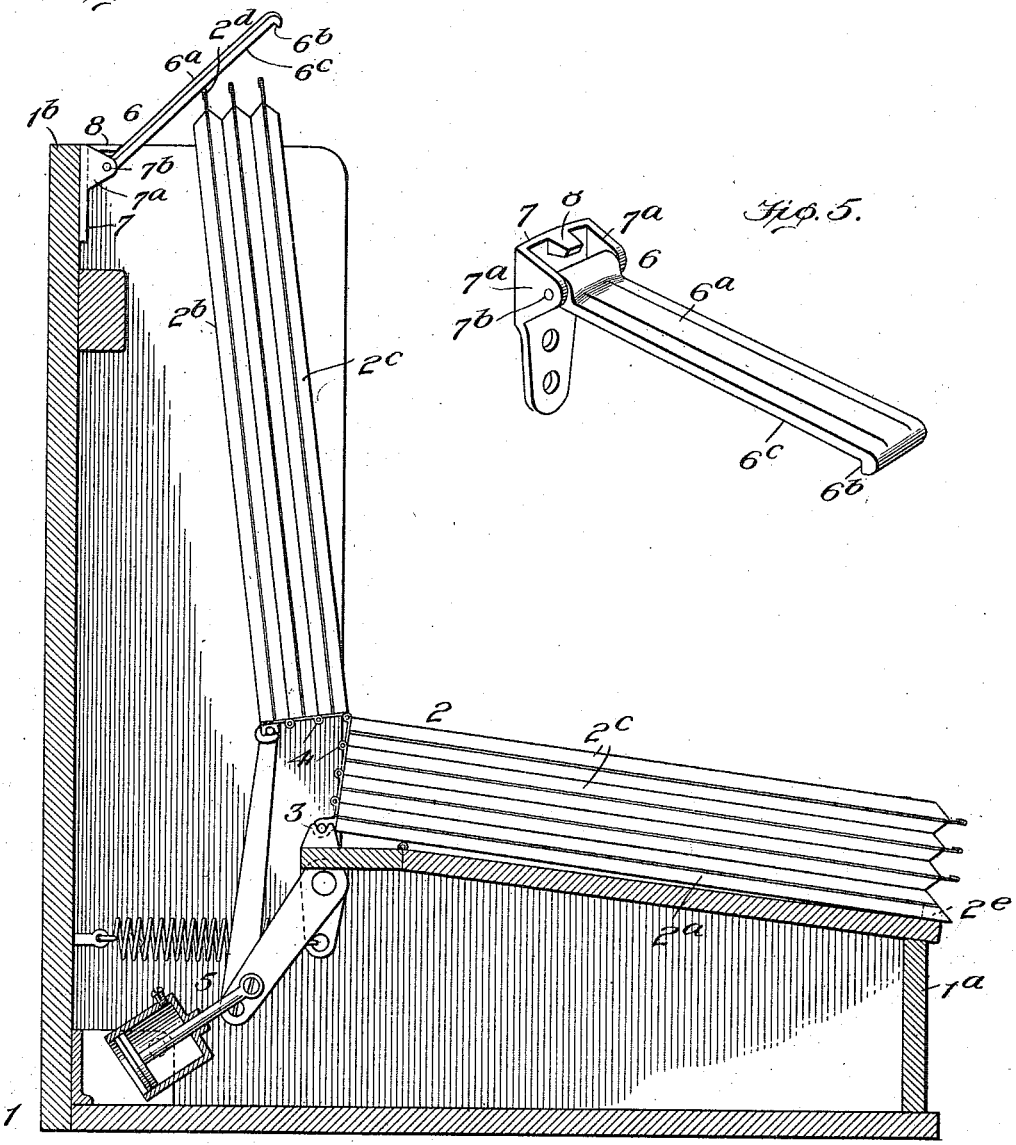

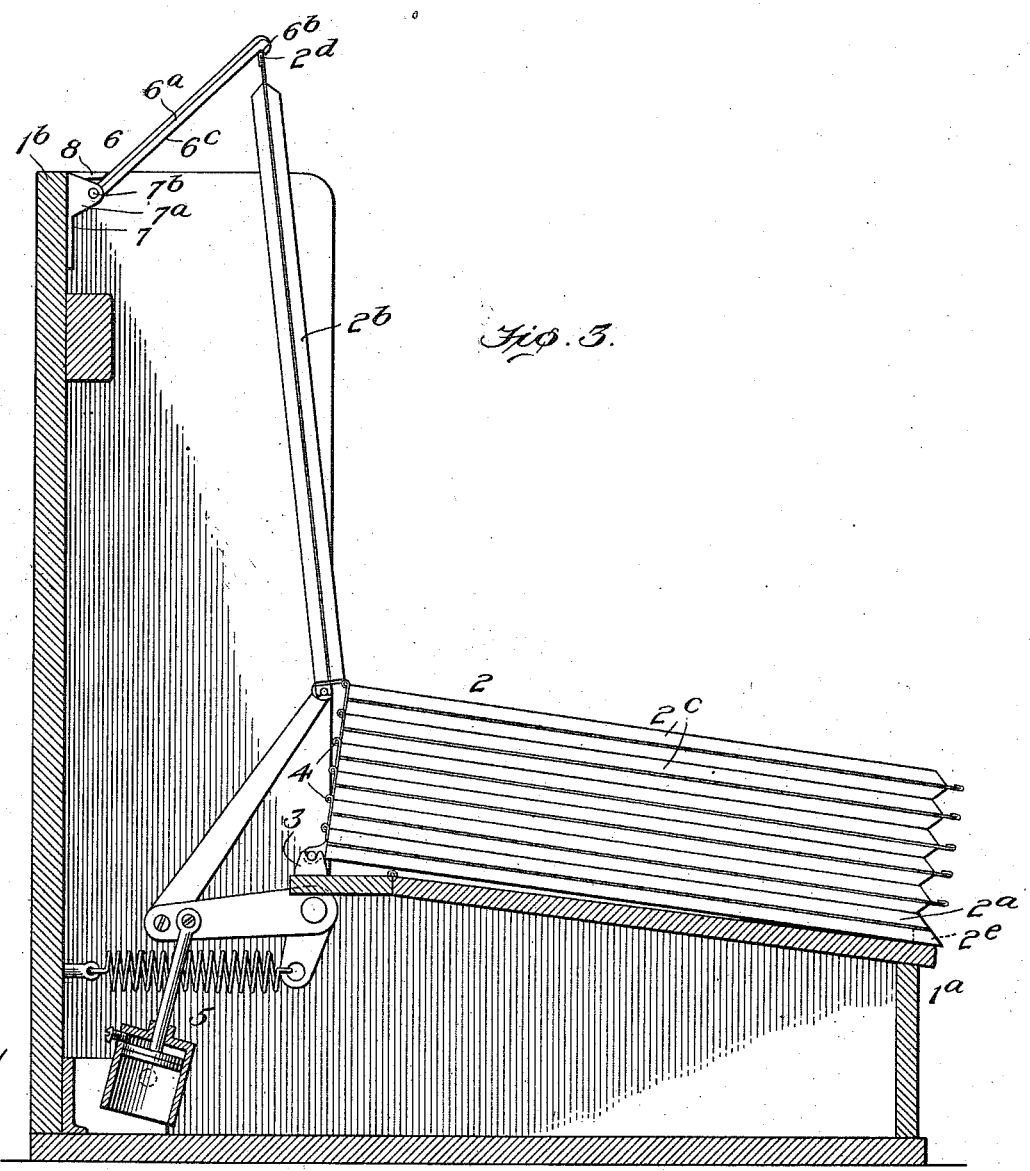

HARRY J. HICK, OF ALLIANCE, OHIO, ASSIGNOR TO THE McCASKEY REGISTER COMPANY, OF ALLIANCE, OHIO, A CORPORATION OF OHIO.

FILING APPLIANCE.

973,195.   Specification of Letters Patent.   Patented Oct. 18, 1910.

Application filed April 30, 1909. Serial No. 493,127.

*To all whom it may concern:*

Be it known that I, HARRY J. HICK, a citizen of the United States, residing in Alliance, in the county of Stark and State of Ohio, have invented certain new and useful Improvements in Filing Appliances, of which the following is a specification, reference being had therein to the accompanying drawings.

This invention relates to a filing device, commonly known as a credit account appliance, having a set of pivotally mounted leaves.

The invention is more particularly adapted for that type of appliance in which the lower edges of a set of leaves move forward when one or more of the leaves are operated from a substantially vertical to a substantially horizontal position. And the invention has for one of its objects in an appliance of this character to produce a combined guide and lock for the leaves, operating to lock the leaves together when they are in normal upright position and to move the upper edges of the leaves forward substantially the same distance as the lower edges of the leaves move forward when one or more of the leaves are operated to a substantially horizontal position.

A further object of the invention is to lock the rearmost leaf upright when all of the remaining leaves are moved downwardly or into the horizontal position.

In the following specification and the accompanying drawings, I have described and illustrated the invention as applied to a filing device or account register such as illustrated, described and claimed in the patent isued to Staples and Potter, May 14, 1907, No. 853,651; but it will be understood that my invention is not limited to the application herein described and illustrated.

Referring to the drawings, Figure 1 is a side elevation of a filing device or account appliance illustrating one application of my invention, the leaves of the filing device being in normal upright position. Fig. 2 is a view similar to Fig. 1, but showing some of the leaves reclined to a substantially horizontal position. Fig. 3 is a view similar to Figs. 1 and 2, but showing all of the leaves, except the rearmost leaf, reclined to a horizontal position. Fig. 4 is a fragmentary front view of the filing device. Fig. 5 is a perspective view of the combined guide and lock.

In the drawings, 1 indicates as a whole a housing or casing, which may comprise a desk portion $1^a$, and a back $1^b$, forming a suitable support, as well as a closure, for a series of pivotally mounted leaves 2. The series of leaves 2 comprises a front leaf $2^a$, a back leaf $2^b$ and intermediate leaves $2^c$.

3 indicates a pivotal support or supports for the front leaf $2^a$.

4 indicate devices for pivotally mounting and connecting the leaves together. When one or more of the leaves are operated from a substantially vertical to a substantially horizontal position, the pivotal mounting and connecting devices 4 operate to move the lower edges of all the remaining upright leaves forwardly.

5 indicates as a whole counter-balancing devices for the leaves. These devices may be of any well-known or preferred construction. If desired the counter-balancing devices 5 may be omitted without affecting the operation of the leaves 2.

6 indicates the combined guiding and locking device for the leaves. This device preferably comprises an arm $6^a$ pivotally mounted on the back $1^b$, and a flange or lip $6^b$ arranged at or near its free end. The lower surface $6^c$ of the arm is flat and operates as the guide surface for the upper edge $2^d$ of the rearmost leaf $2^b$. The leaf $2^b$ may be provided in any suitable manner with an anti-friction surface which will ride on the surface $6^c$. This combined locking guide, as shown in the drawings, is located in the casing at a point between the side edges or ends of the rearmost leaf, as indicated in Fig. 4, and, when raised into operative position, slidingly engages the upper edge of the said leaf at that point, as seen in Fig. 2; and it is arranged and operates to guide the rearmost leaf in its up and down movements; and, as indicated in Fig. 3, to positively hold it in upright position when all of the leaves in front of it are reclined. The pivoting means for the arm $6^a$ preferably comprise a plate 7, adapted to be suitably secured to the back $1^b$, and provided with a pair of apertured supports $7^a$ arranged to receive a pivot pin $7^b$.

8 indicates a stop preferably carried by the plate 7. The stop 8 is arranged above the supports 7ᵃ and is adapted to engage the arm 6ᵃ on its upper side to limit the movement of the arm 6ᵃ upwardly.

When the set of leaves 2 is in normal, substantially vertical, position, such as represented in Fig. 1, the guide arm 6ᵃ lies on the upper edges of the leaves 2 with the upper edge of the front leaf 2ᵃ behind the locking flange or lip 6ᵇ. Preferably the front leaf 2ᵃ is provided with a lock engaging bar 2ᵉ along its upper edge which is beveled, as shown, to make a durable coöperating locking edge for the lip 6ᵇ. When the leaves 2 and guide arm 6ᵃ are in this position the former are locked in their normal upright or vertical position. To release the leaves, the arm 6ᵃ is thrown upwardly by a slight movement, whereupon the leaves may each be operated or reclined from the vertical. When the front leaf 2ᵃ is reclined, it operates to move all the remaining leaves bodily upwardly and simultaneously the lower edges of the said leaves forwardly. By reason of this bodily upward movement of the remaining upright leaves, the guide arm is moved upwardly into an inclined position and in engagement with the stop 8 which arrests its further upward movement. The arm 6ᵃ is maintained in this latter position until the front leaf is returned to its normal position and so long as any of the leaves are turned down, as indicated in Fig. 2 where some of the leaves are reclined, and in Fig. 3 where all of the leaves except the rearmost leaf are reclined, the rearmost leaf at this time being positively held in upright position, as hereinbefore stated and as shown in the figure last referred to.

When one or more of the intermediate leaves 2ᶜ are reclined from the vertical, similarly to the front leaf 2ᵃ it will be understood that all of the remaining upright leaves are bodily moved upwardly and their lower edges forwardly. In this operation of one or more of the leaves 2ᶜ, the upper edge 2ᵈ of the rearmost leaf 2ᵇ rides on the flat guiding surface 6ᶜ of the arm 6ᵃ. As the arm 6ᵃ is inclined to the vertical it will operate to move the upper edge 2ᵈ, and the upper edge of each of the remaining upright leaves, forwardly substantially the same distance that the lower edge of each of said leaves is moved; it will therefore be understood that each time a leaf is reclined from the vertical to a horizontal position the forward-most leaf of the remaining upright leaves will be moved forward to substantially the same position occupied by the last leaf reclined, and in position for ready access and operation.

When the front leaf 2ᵃ and all of the intermediate leaves 2ᶜ are operated as above described the rear leaf 2ᵇ is moved bodily upward into its most extreme position with its upper guide edge in engagement with the lock 6ᵇ where it is held or locked upright and can be moved neither forward nor backward. It will therefore be seen that the combined guide and lock device operates to engage the forward-most or front leaf and lock all the leaves in normal upright position, and when the front and intermediate leaves are operated, to engage the rear leaf and prevent it from being reclined.

To those skilled in the art of making apparatus of the class described, many alterations in construction and widely differing embodiments and applications of my invention will suggest themselves, without departing from the spirit and scope thereof. My disclosures and the description herein are purely illustrative, and are not intended to be in any sense limiting.

What I claim is:

1. A filing appliance comprising a series of pivotally mounted leaves, and devices connecting the leaves together and operating when one or more of the leaves are reclined to move the lower edges of the remaining upright leaves forwardly, in combination with a combined guide and lock device for locking the leaves in normal upright position and, when one or more of the leaves are reclined, for guiding the upper edges of the remaining upright leaves forwardly.

2. In a filing appliance, the combination of a series of leaves having means operating, when one or more of them are reclined, to move the lower edges of the remaining leaves forwardly, and a pivoted guide for the upper edges of the leaves provided with means for engaging the front leaf of the series of leaves to lock all of the leaves in normal upright position.

3. In a filing appliance, the combination of a series of leaves, means for connecting the leaves together relatively to each other and operating to move the lower edges of the remaining upright leaves forwardly when one or more of them are reclined, a guide for the upper edge of the rear leaf of the series, and means carried by the guide for locking all of the leaves in normal upright position.

4. In a filing appliance, the combination of a series of leaves, means for connecting the leaves together relatively to each other and operating to move the lower edges of the remaining upright leaves forwardly when one or more of them are reclined, a guide for the upper edge of the rear leaf of the series, and means carried by the guide for locking all of the leaves in normal upright position and for locking the rear leaf upright when all of the leaves forward of the said rear leaf are reclined.

5. In a filing appliance, the combination of a series of leaves, means for connecting the leaves together relatively to each other and operating to move the lower edges of the remaining upright leaves forwardly when one or more of them are reclined, and a combined guiding and locking device for guiding the upper edge of the rear leaf of the series and for locking all of the leaves in normal upright position.

6. In a filing appliance, the combination of a series of pivotally mounted leaves, and a combined pivotally mounted guide and lock device, for guiding the upper edges of the leaves forwardly when one or more of them are reclined and for locking all of the leaves in normal upright position.

7. In a filing appliance, the combination of a series of pivotally mounted leaves, and a combined pivotally mounted guide and lock device, for guiding the upper edges of the leaves forwardly when one or more of them are reclined and for engaging the front leaf of the series to lock all of the leaves in normal upright position.

8. In a filing appliance, the combination of a series of pivotally mounted leaves, and means for locking the series of leaves in normal upright position and for locking the rear leaf upright when all of the leaves forward of the said rear leaf are operated.

9. A guide for a filing appliance having a series of pivotally mounted leaves, means for pivotally supporting the said guide, and a locking means carried by the guide at or near its free end for locking the series of leaves in normal upright position.

10. A guide for a filing appliance having a series of pivotally mounted leaves, means for pivotally supporting the said guide, and a locking means carried by the guide at or near its free end for locking the series of leaves in normal upright position, and for engaging and locking the rear leaf in upright position when all of the other leaves of the series are operated.

11. In a filing appliance, the combination of a series of leaves, means permitting the said leaves to swing from a vertical position to a horizontal position and vice versa, and means automatically operating to lock all the leaves in vertical position.

12. In a filing appliance, the combination of a series of leaves, means permitting the leaves to swing from a substantially vertical to a substantially horizontal position and vice versa, and a locking guide with which the rearmost leaf has sliding engagement at a point between the two side edges or ends of the leaf, arranged and operating to guide said rearmost leaf in its up and down movements, and to positively hold it in upright position when all of the leaves in front of it are reclined.

In testimony whereof I affix my signature, in the presence of two witnesses.

HARRY J. HICK.

Witnesses:
 JOHN D. CATHON,
 J. E. GOLDSTEIN.